W. A. PARKER.
Fifth-Wheel.
No. 167,927.  Patented Sept. 21, 1875.
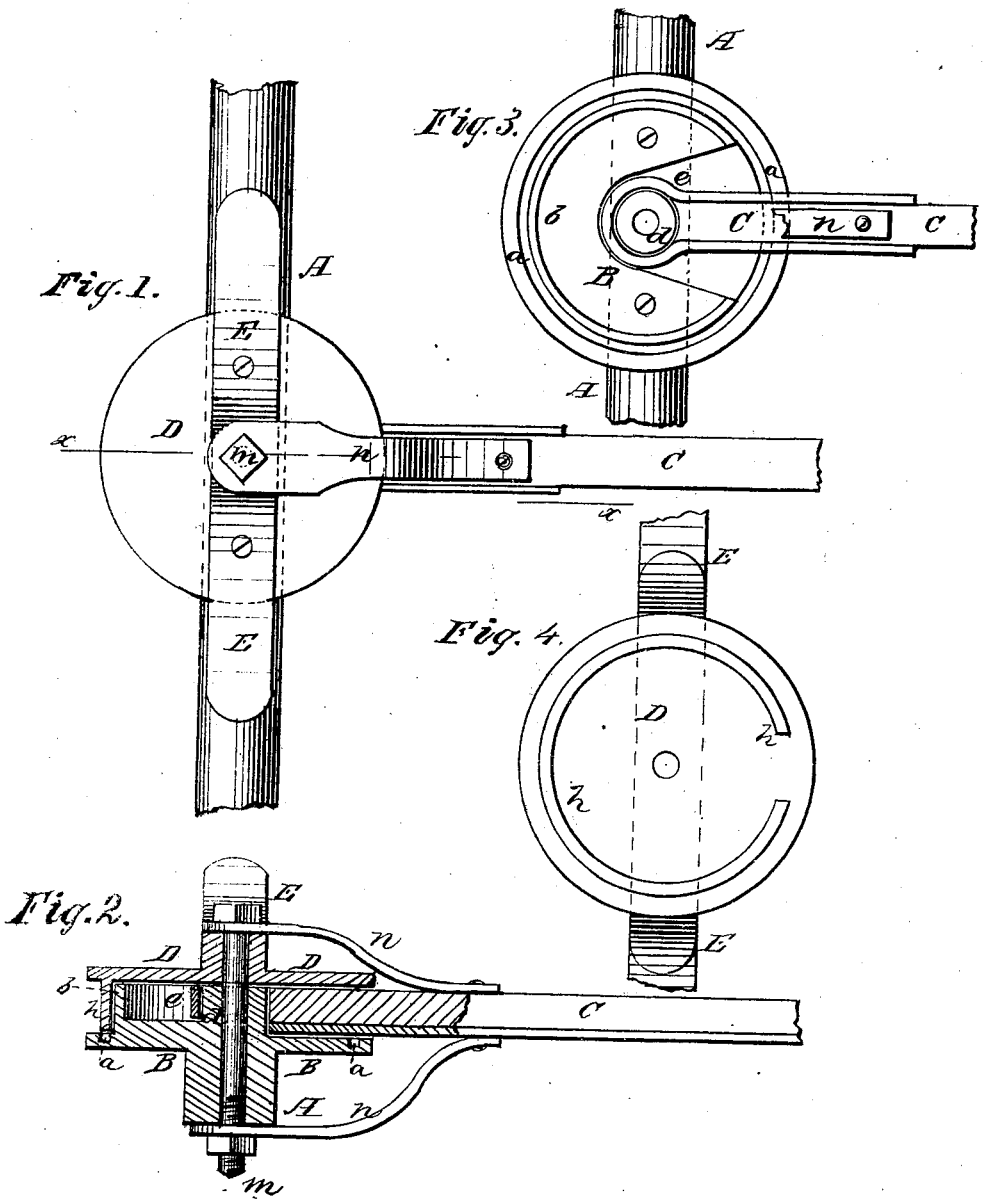

UNITED STATES PATENT OFFICE.

WILLIAM A. PARKER, OF MARSHFIELD, MISSOURI.

IMPROVEMENT IN FIFTH-WHEELS.

Specification forming part of Letters Patent No. 167,927, dated September 21, 1875; application filed July 27, 1875.

*To all whom it may concern:*

Be it known that I, WILLIAM A. PARKER, of Marshfield, in the county of Webster and State of Missouri, have invented a certain new and useful Improvement in Wagons; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a fifth-wheel for vehicles, as will be hereinafter more fully set forth.

In the annexed drawing, Figure 1 is a plan view of my invention. Fig. 2 is a longitudinal section of the same through the line $x\ x$ of Fig. 1. Figs. 3 and 4 are detached views of the two parts of the wheel.

A represents the front axle of a vehicle, on the center of which is secured a circular plate, B, provided near its outer edge on the top with a circular groove, $a$, and within said groove is a concentric flange, $b$, extending around the front and sides of the plate, leaving the rear open. The upper surface of the plate B is recessed radially from around the center to the ends of the flange $b$, as shown in Fig. 3. In the center of the plate B is an upward-projecting hub, $d$, of the same height as the flange $b$. Around this hub is placed an eye, $e$, formed on or attached to the end of the reach C, which connects the front and rear axles. E represents the spring-bar attached to the top of a circular plate, D, which is on its under side, formed with a circular flange, $h$. This flange fits around the flange $b$ and in the groove $a$ of the plate B, as shown in Fig. 2, and has on its rear side a space cut out, as seen in Fig. 4, for the passage of the reach C. M is the king-bolt passing through the centers of the parts thus described, and through braces $n\ n$, connecting with the top and bottom of the reach. The fifth-wheel thus constructed removes all the strain from the king-bolt. It is simple, cheap, and durable, and not liable to get out of order.

Having thus fully described my invention, what I claim as new, and desire to secure by Letters Patent, is—

The plate B, having groove $a$, flange $b$, and hub $d$, and plate D having flange $h$, in combination with axle A, spring-bar E, and reach C, having eye E, all substantially as and for the purposes set forth.

In testimony that I claim the foregoing as my own I affix my signature in presence of two witnesses.

W. A. PARKER.

Witnesses:
 WM. H. YANDLE,
 WM. S. GEORGE.